United States Patent
Gresch et al.

(10) Patent No.: US 10,827,675 B2
(45) Date of Patent: Nov. 10, 2020

(54) DRIVE SYSTEM OF A UTILITY VEHICLE

(71) Applicant: Deere & Company, Moline, IL (US)

(72) Inventors: Valentin Gresch, Kaiserslautern (DE); Norbert Fritz, Ilvesheim (DE); Martin Kremmer, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/717,357

(22) Filed: Sep. 27, 2017

(65) Prior Publication Data

US 2018/0084723 A1    Mar. 29, 2018

(30) Foreign Application Priority Data

Sep. 27, 2016    (DE) .................. 10 2016 218 595

(51) Int. Cl.
| | |
|---|---|
| *A01D 41/127* | (2006.01) |
| *A01B 67/00* | (2006.01) |
| *A01F 15/04* | (2006.01) |
| *A01F 15/08* | (2006.01) |
| *F16H 61/47* | (2010.01) |

(52) U.S. Cl.
CPC .......... *A01D 41/1274* (2013.01); *A01B 67/00* (2013.01); *A01F 15/04* (2013.01); *A01F 15/0841* (2013.01); *F16H 61/47* (2013.01)

(58) Field of Classification Search
CPC ..... A01D 41/1274; A01B 67/00; F16H 61/47; A01F 15/04; A01F 15/0841
See application file for complete search history.

(56) References Cited

U.S. PATENT DOCUMENTS

| | | | |
|---|---|---|---|
| 7,174,831 B2 | 2/2007 | Roth | |
| 2008/0315559 A1* | 12/2008 | Murakami | ............. A01B 67/00 280/446.1 |
| 2010/0115902 A1 | 5/2010 | Schlesser et al. | |
| 2012/0310491 A1 | 12/2012 | Vermeulen | |
| 2015/0208586 A1 | 7/2015 | Lang et al. | |

FOREIGN PATENT DOCUMENTS

| | | |
|---|---|---|
| DE | 102005029405 A1 | 1/2007 |
| EP | 1153538 A2 | 11/2001 |
| EP | 1350658 A1 | 10/2003 |

(Continued)

OTHER PUBLICATIONS

European Search Report issued in counterpart application No. 17191336.1 dated Feb. 28, 2018. (6 pages).

*Primary Examiner* — Yuen Wong

(57) ABSTRACT

A drive system of a utility vehicle comprises a drive motor, a load drive train to drive a load, a propulsion drive train to driver propulsion means of the utility vehicle, and a control unit, which is connected to an actuator for setting the transmission ratio of the propulsion drive train, can be provided with a signal concerning the power consumption of the load, and generates the correction value sent to the actuator on the basis of the signal, so that the propulsion speed of the utility vehicle remains at least approximately constant even if there is a change of the power consumption of the load and/or a pitching motion of the utility vehicle caused by a change of the power consumption of the load is minimized.

8 Claims, 2 Drawing Sheets

(56) References Cited

FOREIGN PATENT DOCUMENTS

| | | | |
|---|---|---|---|
| EP | 1609349 | A1 | 12/2005 |
| EP | 1658765 | A1 | 5/2006 |
| EP | 1974601 | A1 | 10/2008 |
| EP | 2183955 | A1 | 5/2010 |
| EP | 2759194 | A1 | 7/2014 |
| EP | 2803256 | A1 | 11/2014 |

\* cited by examiner

DRIVE SYSTEM OF A UTILITY VEHICLE

RELATED APPLICATIONS

This document claims priority based on German Patent Application No. 102016218595.0, filed on Sep. 27, 2016, which is hereby incorporated by reference into this application.

FIELD OF INVENTION

The invention concerns a drive system of a utility vehicle.

BACKGROUND

Agricultural utility vehicles usually comprise drive systems having drive motors, which serve not only to propel the utility vehicle, but also to drive a load. Such a load can, in particular, be a device for the gathering and processing of crops. Said load can be detachable from the actual utility vehicle and can be powered by a PTO shaft from the drive motor of the drive system, as in the example of a bailer, which is pulled by a tractor, or it is situated on board the utility vehicle, like a threshing and separating device of a combine or a cutting drum of a field chopper. The load is driven by the drive motor via a load drive train, which contains (only) mechanical or (also) hydraulic or electric power transmission elements. Analogously, the propulsion of the utility vehicle takes place through the drive motor via a propulsion drive train, which likewise contains (only) mechanical or (also) hydraulic or electric power transmission elements. The drive motor of the utility vehicle can be a combustion engine or an electric motor.

Due to the operation of the utility vehicle, the power draw of the load is not constant in all cases. For instance, the crop throughput in a combine or field chopper can change more or less rapidly under varying stand densities, which leads to varying load power draws on the drive motor. Because of their mechanical structure, some loads require drive powers that vary over time, for example baling machines, in which a plunger is periodically pressed into a bale chamber in order to compact the crop into a rectangular bale.

Load changes in a secondary drive, such as the PTO shaft of a tractor, in the hydraulics or electric power draws of a mobile utility vehicle lead to variation of the drive motor rotary speed, in particular if the power limit of the diesel engine is reached or exceeded or if, in order to adhere to exhaust gas standards, the injected amount of fuel is limited in transient operating states. Variations of the drive motor rotary speed, if the transmission ratio of the propulsion drive train is constant, lead to variations of the longitudinal acceleration of the vehicle and (in particular in the case of suspended systems) to pitching of the utility machine. Also, cyclic mechanical loads (for example tensile forces) on the utility machine can lead to longitudinal acceleration and pitching motions. In addition, the components of the propulsion drive train, the tires of the utility vehicle, and the coupling elements between the utility vehicle and a load being pulled by it become highly stressed by the continual changes of speed and they rapidly wear. In addition, the speed changes make control of a transfer process from a harvesting machine to a transport vehicle transporting the harvest more difficult.

It was proposed in European Patent Application No. EP 1 609 349 A1, to control the rotary speed of the drive motor of a self-propelled harvesting machine predictively in dependence on the power consumption of the load that is supplied in each case. The propulsion speed is kept constant via a hydraulic, and thus adjustable, transmission of the propulsion drive train and even the rotary speed of the load (for example, a chopping drum) can be kept constant via an adjustable transmission of the load drive train.

A self-propelled harvesting machine in which the rotary speed of the drive motor is likewise predictively controlled in dependence on the power consumption of the load that is to be applied in each case, in order to avoid stalling of the drive motor in the case of sharply rising throughputs, is described in European Patent Application No. EP 1 658 765 A1. The propulsion speed of the harvesting machine is set by the operator and remains constant.

European Patent Application No. EP 2 183 955 A1 proposes to register, in the case of a combination of a tractor and a rectangular baler, the cyclically changing power draw of the load, which is a result of the back and forth movement of the plunger of the bale press. In addition, the crop throughput is predictively detected and its effect on the power draw of the load is learned. By means of the load power drawn that is to be expected for a given crop throughput, the drive motor of the tractor is predictively controlled so that its rotary speed remains constant. Because of this, the propulsion speed of the tractor should also vary less than previously.

The rotary speed controls of the drive motor envisioned in the prior art according to European Patent Application No. EP 1 609 349 A1, European Patent Application No. EP 1 658 765 A1 and European Patent Application No. EP 2 183 955 A1, which are based on a predictive detection of the expected power draw of the load, prove to be problematic, at least in the case of the power changes demanded from a tractor by rectangular balers, in that current combustion engines are hardly capable of keeping up with the required power changes, which can lie in the range of 100 kW, in a complete and timely way. The rotary speed changes of the drive motor thus cannot be completely regulated. The rotary speed changes of the drive motor that nevertheless still remain lead to changes in the propulsion speed of the tractor, which is not readjusted according to European Patent Application No. EP 2 183 955 A1, and lead, via the varying input rotary speed of the hydrostatic transmissions of the propulsion drive trains according to European Patent Application No. EP 1 609 349 A1 and European Patent Application No. EP 1 658 765 A1, to vehicle speed changes there, too, speed changes that at best could be compensated by a speed control registering the actual propulsion speed, which however would respond only in a delayed manner and thus cannot unconditionally keep the speed constant. Also, control instabilities would be a concern.

The problem underlying the invention is seen as making available an improved drive system of a utility vehicle, which does not have said disadvantages or has them to a lesser degree.

SUMMARY

A drive system of a utility vehicle comprises a drive motor, a load drive train driven by the drive motor to drive a load with a power draw that varies over time and that leads to a change of the rotary speed of the drive motor, a propulsion drive train driven by the drive motor to drive propulsion means of the utility vehicle, which has a transmission ratio that can be changed by means of an actuator, and a control unit, which is connected to the actuator, can be provided with a signal concerning the power consumption of the load and can be operated to produce a correction value that is dependent on the signal. The control unit can be operated to produce the correction value that is sent to the actuator on the basis of the signal, so that the propulsion speed of the utility vehicle remains at least approximately constant even if there is a change of the power consumption of the load and/or a pitching motion of the utility vehicle caused by a change of the power consumption of the load is minimized.

BRIEF DESCRIPTION OF DRAWINGS

An embodiment example of the invention which is described in more detail below is shown in the drawing. Here.

DETAILED DESCRIPTION

Figure 1:
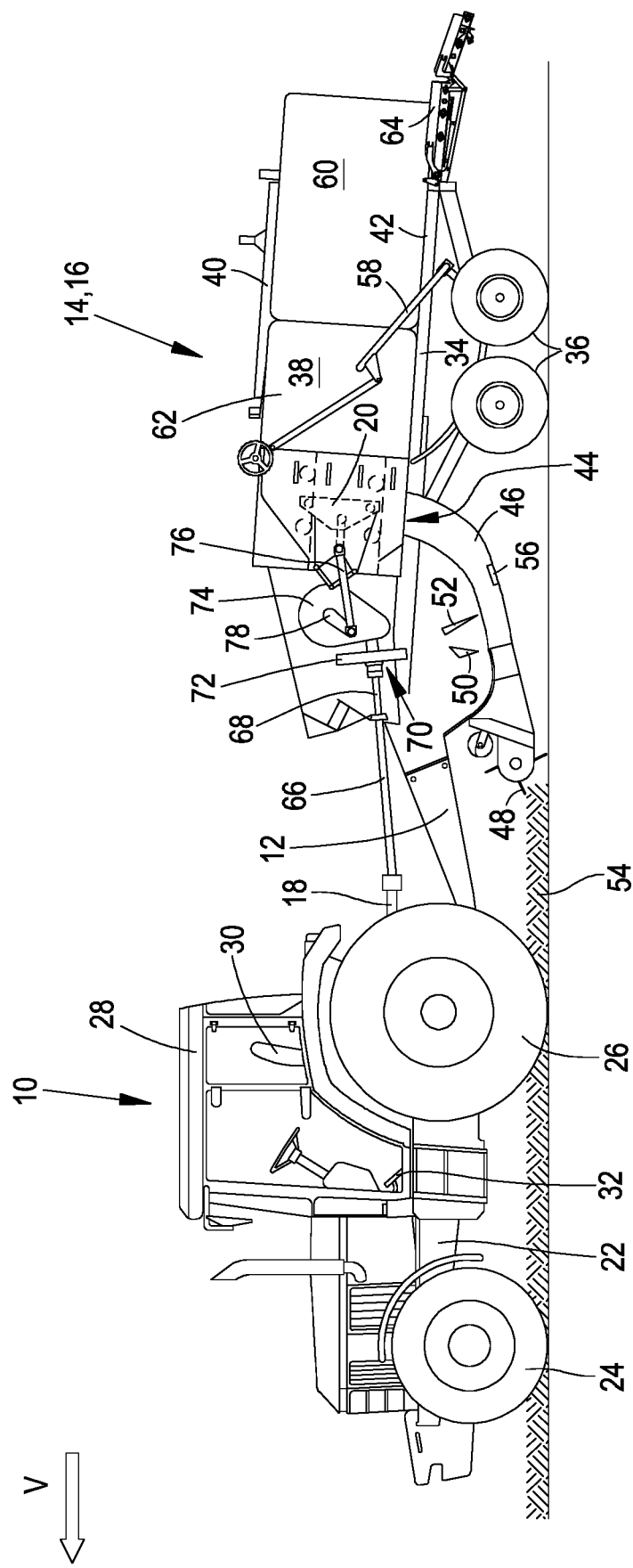
FIG. 1 shows a side view of a utility vehicle in the form of a tractor with an attached load in the form of a rectangular baler.

Generally speaking, signals that contain information regarding the power consumption of a load are submitted to a control unit. Here the information can refer to the absolute power consumption of the load or a change of the power consumption of the load. The control unit can thus evaluate what effect a change of the power consumption of the load has on a rotary speed of a drive motor, which can be a combustion engine or electric motor, and what effect said change of rotary speed will have on the propulsion speed of a utility vehicle. The transmission ratio of the propulsion drive train is adjusted by an actuator, which is controlled by the control unit, so that even if the power consumption of the load should change, in the end (due to the compensation of the effect of the expected rotary speed change on the propulsion speed) an at least approximately constant propulsion speed of the utility vehicle results. If the power draw of the load rises, the control unit will thus let the actuator control the propulsion drive train in terms of a higher transmission ratio (faster speed) of the utility vehicle and analogously reduce the transmission ratio if the power draw of the load decreases.

Alternatively or additionally, the control unit commands the actuator so that a pitching motion of the utility vehicle caused by a change of the power consumption of the load is minimized. A change of the power consumption of the load leads, as described, to a change of the rotary speed of the drive motor, which in turn acts on the propulsion speed of the utility vehicle. If the power consumption of the load becomes greater, the utility vehicle slows down, and if the power consumption of the load becomes smaller, it accelerates. This speed change, due to the elasticities of the soil engagement means of the utility vehicle (tires and/or possibly suspensions of wheels or caterpillar track chassis), leads to pitching motions, i.e., the utility vehicle tips forward when the power consumption of the load increases and backward when the power consumption of the load decreases. According to the teaching of this invention, these pitching motions can be reduced or completely avoided by the adjustment of the transmission ratio of the propulsion drive train. Accordingly, if the power consumption of the load rises, which would, without compensation, lead to the expected forward pitching of the utility vehicle, the control unit will command the actuator in terms of an acceleration of the utility vehicle, in order to avoid the pitching motion. Analogously, the control unit will command the actuator in terms of a deceleration of the utility vehicle when the power consumption of the load decreases, in order to compensate the pitching motion.

The speed control of the utility vehicle is an open loop system, to which the signal concerning the power consumption of the load is sent as input parameter. In this way, an at least nearly complete elimination of the effect of the drive motor speed change caused by changes of the power draw of the load on the propulsion speed and/or orientation of the utility vehicle can be achieved with comparably low expenditure and without control instabilities.

Preferably, the control unit can be operated to infer an expected power consumption of the load from the signal. In one possible embodiment, the signal can refer to the amount of crop lying upstream from a harvesting machine and the control unit can infer, by means of the signal, the power consumption of the load at a future point in time and thus predictively adjust the transmission ratio of the propulsion drive train. In another possible embodiment, the signal can be directly or indirectly dependent on the position of the load in the form of a plunger of a rectangular baler and, for example, be disposed in the load drive train. By means of the power consumption, which periodically changes, the control unit can conclude what the power consumption will look like in the near future and thus predictively adjust the transmission ratio of the propulsion drive train.

The control unit can calculate the correction value by means of the change of the rotary speed of the drive motor that is to be expected for the expected power consumption of the load. Accordingly, the power consumption of the load is detected by a sensor via the control unit or is calculated in some other way. The rotary speed change is calculated by means of the power consumption of the load and, based on that, the preferred setting of the actuator for adjusting the propulsion drive train is determined. This procedure can also be simplified by converting the signal concerning the power consumption of the load directly to a suitable correction signal for the actuator by means of permanently stored or learned relationships.

The control unit can calculate the signal concerning the power draw of the load (i.e., as noted above, the absolute power draw or a change of the power draw of the load) by means of operating data for the drive motor. Thus, from operating data for the drive motor such as rotary speed and/or torque and/or power, which are available from a motor control unit, the power that can be drawn by the load can be derived or estimated. Although the drive motor does also supply the propulsion drive train and possibly other devices of the utility vehicle such as air conditioning, lighting, etc., with power, there is the possibility of estimating changes of the power consumption of the load by means of the timewise course of the total drawn power, since power draws that vary with specific frequencies are usually associated with the (variable) load. Analogously, the signal concerning the power draw of the load can be registered by a sensor for detecting the power drawn in the load power train. In this case, the total power draw of the total load, for example in a PTO shaft of the utility vehicle, or only the power consumption of a part of the load that is responsible for most of the power consumption can be registered. Thus, in the case of a rectangular baler, one can follow the power draw by means of a sensor that registers the load acting on the plunger (see U.S. Pat. No. 7,174,831). There is also the possibility of querying the power draw of the load by a load control unit, since the control unit controls driven elements of the load and is informed about what load is needed right now and in the near future. The control unit could also be connected to a sensor for registering a parameter that is affected by the power draw of the load for purposes of registering the power draw of the load. Such a sensor can, for example, register the acceleration of the utility vehicle in the forward direction or pitching motions of the utility vehicle. In this case, one takes advantage of the fact that the change of the power draw of the load changes the rotary speed of the drive motor of the utility vehicle, which acts on the utility vehicle via the propulsion drive train and accelerates or decelerates it and possibly leads to a pitching motion forward or backward. This acceleration or motion can be registered and utilized to estimate the power taken from the load.

In addition, the control unit can register the signal over a time period and, by means of its time course, can infer the future power consumption of the load and, in the case of loads that change the power draw cyclically, such as rectangular balers, its periodicity. Finally, the control unit can be operated to optimize a comfort factor calculated on the basis of acceleration and rotary speed measurements. Accordingly, the control unit registers sensor parameters that affect the comfort of the operator of the utility machine at his work station, such as the forward and backward acceleration and the rotary rate about the pitch axis, and calculates from this a comfort factor that represents these parameters. The control unit commands the actuator in terms of an optimization of the comfort factor. Here, one can utilize the procedures described above and in the following embodiment example.

FIG. 1 shows an agricultural utility vehicle 10 in the form of a tractor, which pulls a load 14 in the form of a rectangular baler 16 via a tow bar 12. A PTO shaft 18 serves to drive movable elements of the load 14 and, in particular, a plunger 20. The utility vehicle 10 is built on a chassis 22, which is supported on steerable front wheels 24 and drivable rear wheels 26 and carries a cabin 28, in which there is an operator work station 30. By means of an input device 32 in the form of a pedal or a driving lever, which can set an intended speed without constant operator interaction, the propulsion speed of the utility vehicle 10 can be set by an operator in a manual mode of operation.

The rectangular baler 16 serves to make rectangular bales. The rectangular baler 16 has a frame 34 that is supported on tandem support wheels 36. The tow bar 12 is connected to the frame 34 and extends forward from the frame and is designed so that it can be attached to the utility vehicle 10, which is fitted with the PTO shaft 18, in order to provide power to drive various driven components of the rectangular baler 16. A bale compaction chamber 38 in the form of a chamber having a rectangular cross section is formed partly by a housing upper section 40 and a housing lower section 42, where the housing lower section 42 is provided with a material inlet 44, to which a curved feed channel 46 is connected. The side walls of the bale chamber 38 and/or the housing upper section 40 can be rigidly attached or can be adjustable by actuators, which are not shown, so that the cross section of the bale chamber 38 can be varied. The lateral pressure on the partial bale 62 and thus the compression density can be varied via the setting of the actuators.

A feed device has a crop pickup device 48 in the form of a pickup with an associated hold-down clamp, a compression fork 50, and a stuffer fork 52. The crop pickup device 48 comprises an auger that conveys toward the center and is disposed in front of the feed channel 46 in order to lift a swath 54 of crop from the ground and deliver it to the compression fork 50, which serves to compress crop in the feed channel 46 until a charge of preselected density has collected in the feed channel 46 and is forced by the stuffer fork 52 into the bale chamber 38 through the material inlet 44. Swivel mounted at a forward lower position in the feed channel 46 is a spring-loaded flap 56, which pivots in dependence on the density of the crop in the feed channel 46 and reports as soon as a desired material density is reached in the feed channel 46 in order to actuate the current of an electrical control circuit via a control unit 98 (see FIG. 2), the control circuit making a corresponding drive connection, which activates the stuffer fork 52, so that the charge of crop moves into the bale chamber 38. In the following, directional data such as forward, backward, always refer to the forward direction V of the utility vehicle 10 and the rectangular baler 16, which runs from right to left in FIG. 1.

When the charge of crop has been put into the bale chamber 38, the plunger 20 is actuated after the stuffer fork 52 by means of a suitable drive in a controlled time sequence in order to move the crop to the rear of the bale chamber 38, where it is compacted into a stack. After the stack of compacted material has reached a preselected length, a needle assembly 58 for supplying binding twine, which contains several curved needles, is actuated in order to feed a plurality of strands of twine to a corresponding number of knotters (not shown), which act to wrap the twine lengths around the preselected stack length, in order to form a bale 60, which is ready for unloading, which then takes place when it is pushed out from the rearward end region of the bale chamber 38 by an incomplete partial bale 62, as it increases in length, since new charges of crop are being pushed into the bale chamber 38.

The plunger 20 is designed for a back and forth motion into the bale chamber 38, between a retracted position in front of the material inlet 44 and a (shown in FIG. 1) partially extended position over the material inlet 44, from which it can move still farther toward the rear until it runs against a partial bale 62. This motion of the plunger 20 has the result that charges of crop that are introduced into the bale chamber 38 from the feed channel 46 are compacted against a stack of crop, which includes the partially formed bale 62 and/or the complete bale 60. For gentle deposition of the bale 60 on the ground, a ramp 64 is attached at the rear end of the frame 34 as a rearward extension of the housing lower section 42.

The plunger 20 drive takes place via the PTO shaft 18 of the utility vehicle 10, which drives an input shaft 68 of the drive device 70 of the plunger 20 via an articulated shaft 66. The input shaft 68 drives a flywheel 72 and, via a transmission 74, a crank 78, the motion of which is transmitted to the plunger 20 via a connecting rod 76.

Figure 2:
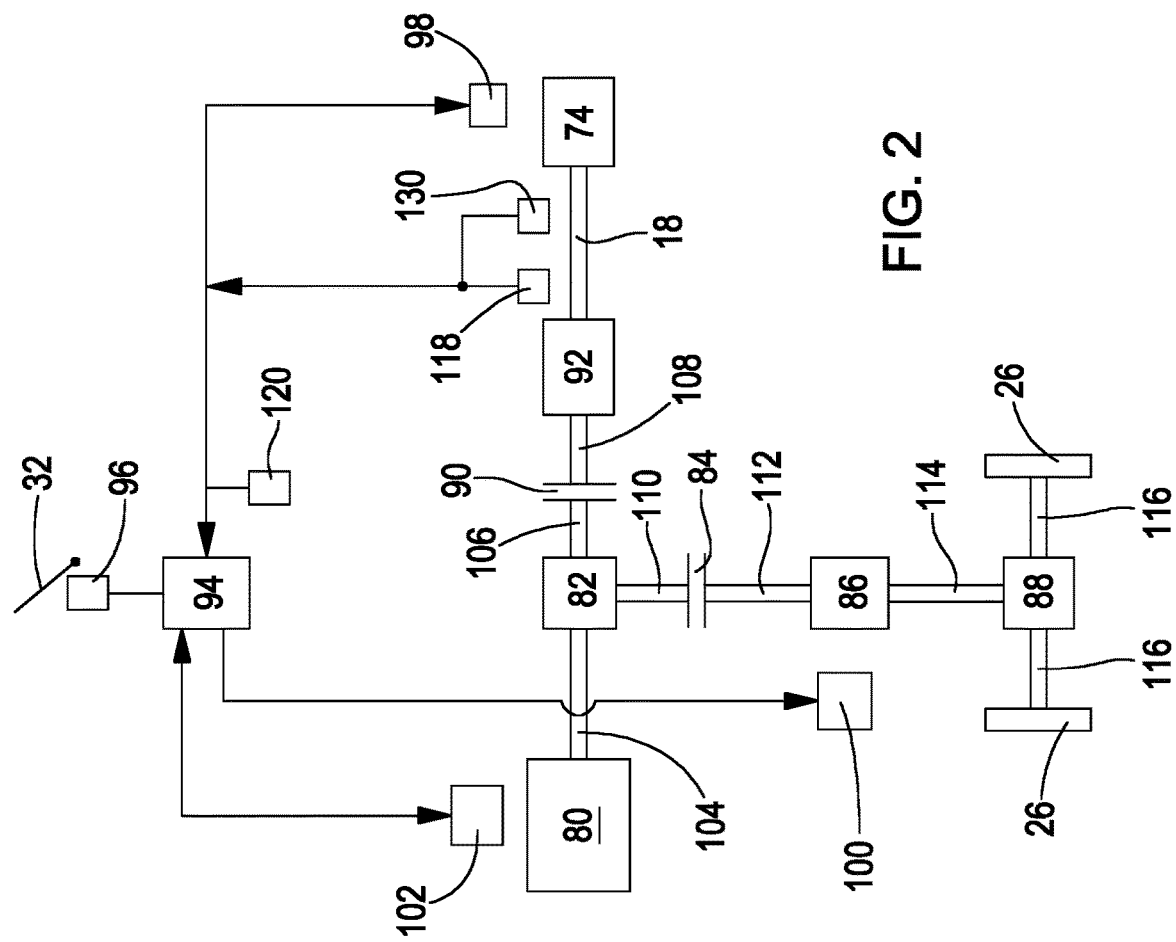
FIG. 2 shows a schematic drawing of the drive system of the utility vehicle.

FIG. 2 shows a schematic diagram of the drive system of the utility vehicle 10 and the load 14. A drive motor 80 of the utility vehicle 10, which can be made as a combustion (diesel) engine or as an electric motor, drives, with its output shaft 104, a transfer case 82, which has a first propulsion output shaft 110 and a load output shaft 106. For one of the shafts 110 or 106, the transfer case 82 can include a direct connection to output shaft 104. The propulsion output shaft 110 drives, via a drive clutch 84, a transmission input shaft 112, which drives a propulsion transmission 86 with a variable transmission ratio (for example, designed as a power shift transmission or a continuously variable transmission), which on the output side drives the rear wheels 26 via a shaft 114, a differential 88, and wheel drive axles 116. Optionally, the propulsion transmission 86 can also drive the front wheels 24 via drive means that are not shown. The load output shaft 106 is in a drive connection with the PTO shaft 18 via a PTO shaft clutch 90 and a PTO shaft transmission 92, where the PTO shaft 18 serves to drive the transmission 74 of the drive device 70 and other driven elements of the load 14.

The transfer case 82, the drive output shaft 110, the clutch 84, the propulsion transmission 86, the shaft 114, the differential 88, and the wheel drive axles 116 form a propulsion drive train driven by drive motor 80 for driving the propulsion means (wheels 26) of the utility vehicle 10, which has a transmission ratio that can be changed by means of the actuator 100. The transfer case 82, the load output shaft 106, the clutch 90, the PTO shaft transmission 92, the PTO shaft 18, and the transmission 74 (with the subsequent components for driving the plunger 20) form a load drive train that can be driven by drive motor 80 to drive the load 14, which, as described below, results in a power consumption leading to a change of rotary speed of the drive motor 80 that varies over time.

An electronic control unit 94 is connected to a control unit 98 of the load 14 (round baler 16), an actuator 100 for adjusting the transmission ratio of the propulsion transmission 86, a motor control unit 102, a speed setting sensor 96 to register the setting of the input device 32, and actuators (which are not shown for reasons of clarity) for engaging and disengaging the clutches 84 and 90, although the latter could also be actuated by the operator by hand or foot.

The plunger 20 of the load 14 is, as described above, periodically driven into the bale chamber 38 and presses against the partial bale 62, with a frequency on the order of 1 Hz. Since relatively high power is required for this, this stress propagates through the load drive train to the drive motor 80, which reacts with changes of rotary speed. These rotary speed changes also lead, via the propulsion drive train, to propulsion speed changes of the utility vehicle 10, which have an adverse effect for the operator. Moreover, the motion of the mass of the plunger 20 also causes a periodic acceleration and deceleration of the entire rectangular baler 16, which propagates to the utility vehicle 10. In both cases, the driver of the utility vehicle 10 experiences this effect both acoustically and in the form of longitudinal accelerations and pitching motions of the utility vehicle 10 at the operator position 30 caused by the elasticity of the tires of the wheels 24, 26 and possibly a front axle suspension.

For reasons of driving safety and driving comfort, there are indeed a number of suspension systems that are intended to reduce oscillating stresses acting on the utility vehicle 10 or on the driver. Most of these suspension systems act passively or semi-actively and cancel the vertical dynamics of the driver. However, there are also active systems and suspension systems that act on other degrees of freedom such as pitching, rolling, or yaw, or that address the transverse and longitudinal dynamics. However, such systems are relatively costly and cannot entirely eliminate the motion.

The lifespan of the utility vehicle 10 and its components is affected when there are cyclic load peaks of the longitudinal dynamics. Due to such cyclic loads, the trailer coupling ring for attaching the tow bar 12 to the chassis 22 often travels from end position to end position if there is play in the connection. As a consequence of this, the amplitude of the cyclic force increases significantly each time, which affects both the wear and the durability of the connection device as well as the comfort of the driver. This effect, of course, also applies to all of the other cyclically stressed components of the entire propulsion drive train, including the tires. From the standpoint of the driver and the utility vehicle 10 and the load 14, there is, for this reason, high interest in reducing the amplitudes of the longitudinal dynamics and the pitching motions, in particular when there are cyclically repeating loads. It is thus desirable for the utility vehicle 10 to be able to automatically detect a regularly repeating external load—due to inertial forces or the induced torque—and to be able to at least partially remedy the resulting periodic longitudinal accelerations and/or pitching motions.

Figure 3:
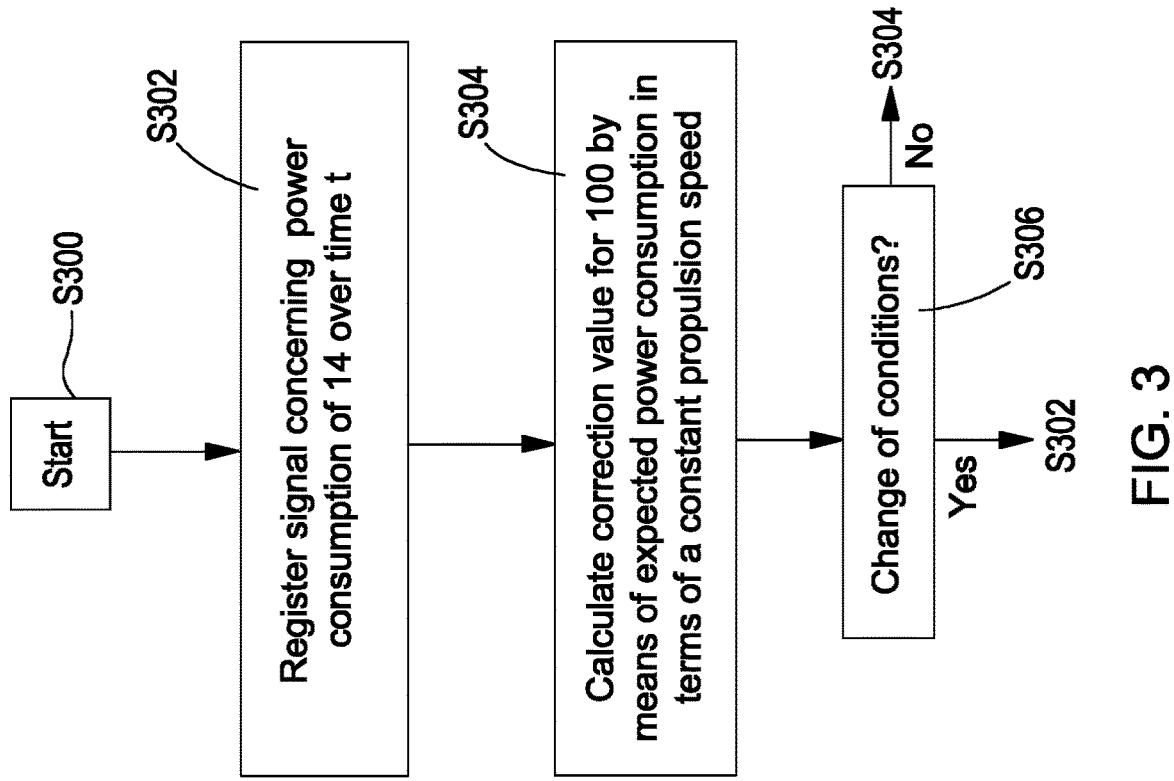
FIG. 3 shows a flow diagram according to which the control unit of the drive system operates.

FIG. 3 shows a flowchart according to which the control unit 94 operates. After the start in step S300 and selection of an automatic mode of operation by the operator by means of an appropriate input into an operator interface (not shown), the utility vehicle 10 with the load 14 (rectangular baler 16) is driven in step S302 over a field and, in doing so, picks up crop and presses it into a bale 60. The propulsion speed of the utility vehicle 10 is in this case initially set by the input device 32, the setting of which is registered by the speed setting sensor 96 and sent to the control unit 94. The control unit 94 commands the motor control unit 102 and the actuator 100 in a substantially known way, i.e., the rotary speed of the drive motor 80 is brought to a value that leads to a suitable rotary speed of the PTO shaft 18 and the actuator 100 is brought into a position in which the desired propulsion speed is reached. If the PTO shaft 92 has a transmission ratio that can be changed by means of an actuator, the control unit 94 can also control the relevant actuator of the PTO shaft transmission 92, which enables an additional degree of freedom, in order to set the rotary speed of the drive motor 80 to an optimum value.

The power consumption of the load 14 can be registered in step S302 by means of a torque sensor 118, which registers the torque transmitted by the PTO shaft 18. It would also be conceivable to register the rotary speed of the drive motor 80 (which indicates the drawn power), which can be transmitted to the control unit 94 by the motor control unit 102. It is also possible for both procedures to be combined or another method known in the prior art for measuring the load of the drive motor 80 can be employed. During step S302, the control unit 94 records the measured torque over the duration of a time span t, which can lie in the order of magnitude of 10 seconds. The recording period is chosen so that it contains a number of periods of the load variations.

With this record, the control unit 94 is finally, in step S304, capable of estimating what power the load 14 will draw in the future in dependence on time. In this regard, reference is made to the disclosure of European Patent Application No. EP 2 183 955 A1, which is incorporated by reference into these documents, where the effect of the harvested amount of crop into the rectangular baler 16 may or may not be taken into account. In order to reduce or avoid entirely the undesirable longitudinal accelerations and/or pitching motions of the utility vehicle 10, the control unit 94 controls the actuator 100 in step S304 so that the transmission ratio of the propulsion transmission 86 is set such that the longitudinal accelerations and/or pitching motions of the utility vehicle 10 that result from the change of load are compensated as precisely as possible. The transmission ratio of the propulsion transmission 86 is accordingly increased in a timely way to accelerate the utility vehicle 10 when the power drawn by the load 14 rises and analogously the transmission ratio of the propulsion transmission 86 is reduced in a timely way in order to decelerate the utility vehicle 10 when the power drawn by the load 14 decreases. In this way, the propulsion speed of the utility vehicle 10 remains constant over time, in spite of the cyclic changes in the power drawn by the load.

Thus, according to this invention, compensating and keeping the propulsion speed change of the utility vehicle 10 constant does not take place through a measurement of the control loop concerning the actual speed (as is known, for example, from European Patent Application No. EP 1 350 658 A1), which sets the transmission ratio of the propulsion transmission 86 in order to keep the propulsion speed of the utility vehicle 10 constant when there are load variations. Such a control loop could give rise to dynamic interactions with a control loop for keeping the rotary speed of the drive motor 80 constant and stability of it would be difficult to maintain. Instead of this closed control loop, an open control loop is used, with the expected power draw of the load 14 or a signal dependent thereon as the input parameter in order to predictively compensate the speed changes resulting from changing power draw. The control unit 94 can command the motor control unit 102 so that it keeps the rotary speed of the drive motor 80 constant by means of the control loop based on the registered rotary speed (i.e., no predictive compensation of the motor rotary speed by means of an open loop for load detection is undertaken, as is proposed in European Patent Application No. EP 2 183 955 A1) or, analogous to European Patent Application No. EP 2 183 955 A1, a predictive, at least partially load-compensating regulation of the rotary speed of the drive motor 80 is undertaken with an open loop.

This is followed by step S306, in which it is queried if a change of the external conditions has taken place, such as a change of the density of the swath 54 or of its moisture content. This change can be recognized by the fact that the regulation of step S304 no longer is optimally functioning, which can be registered by a suitable inertia sensor 120 of the utility vehicle 10. If the conditions have not changed, step S304 is repeated and otherwise step S302. The automatic regulation of step S304 can be interrupted by operator input, for example by manual speed input by means of the input device 32.

According to one possible embodiment, in Step S302, the average rotary speed of the drive motor 80 $n_{Engine\_Mean}$ and the average propulsion speed $V_{Mean}$ can be calculated for the observation time t. Then, each of the averages is derived from the torque and rotary speed signal, and an edge region smoothing filter, for example a so-called hamming window, is applied. The load data preprocessed in this way are then transformed into the frequency region, for example with a meaningfully bounded Fourier series expansion. Since the periodicity of the drawn loads is first of all dependent on the PTO shaft 18, the PTO shaft angle $\theta_{PTO}$ registered, for example, by means of an angle sensor 130 (which need measure only the changes of angle, but not the absolute angles, and, for example, can count teeth that have run by on it) or a quantity that is proportional thereto (for example crankshaft angle, which can be transmitted from the motor control unit 102 to the control unit 94) is selected for the transformation into the frequency region. This results in a periodic function $nP_{PTO}(\theta_{PTO})$, which describes the load-induced change of the rotary speed of the PTO shaft 18 in dependence on its angle of rotation. The relevant periodic change of the motor speed then results from division with the transmission ratio $i_{PTO}$ of the PTO shaft transmission 92:

$$nPEngine(\theta_{PTO})=nP_{PTO}(\theta_{PTO})/i_{PTO}$$

$$i_{PTO}=n_{PTO\_OutMean}/n_{EngineMean}$$

The instantaneous rotary speed of the drive motor 80 as a function of the PTO shaft angle is roughly:

$$nEngine(\theta_{PTO})=n_{Engine\_Mean}+nPEngine(\theta_{PTO})$$

The average transmission $i_{Mean}$ of the propulsion drive train is defined as follows:

$$i_{Mean}=V_{Mean}/n_{Engine\_Mean}$$

Then the following is valid for the instantaneous driving speed:

$$V(\theta_{PTO})=i_{Mean}*nEngine(\theta_{PTO})=i_{Mean}*(n_{Engine\_Mean}+nP_{PTO}(\theta_{PTO})/i_{PTO})$$

It is required that the driving speed be constant and equal to the average value. To achieve this, a periodic function of the PTO shaft angle should be superimposed on the drive transmission ratio. Then one obtains:

$$V_{Mean}=(i_{Mean}+iP(\theta_{PTO}))*(n_{Engine\_Mean}+nP_{PTO}(\theta_{PTO})/i_{PTO})$$

Solving this, one obtains the desired periodic function of the change of the transmission ratio, which should be superimposed on the average transmission ratio calculated by the driving strategy in step S304:

$$iP(\theta_{PTO})=V_{Mean}/(n_{Engine\_Mean}+nP_{PTO}(\theta_{PTO})/i_{PTO})-i_{Mean}.$$

Alternatively or in addition to a measurement of the drawn power of the load, there is the possibility of using a known mechanical transmission ratio in the load drive train to determine the period of the function $nP_{PTO}(\theta_{PTO})$, which is known for a given PTO shaft or engine speed. In the case of this embodiment, the data regarding the transmission ratio of the transmission 74 is communicated from the control unit 98 of the load 14 to the utility vehicle 10 (for example via a bidirectional bus line) and employed to determine the periodic function $nP_{PTO}(\theta_{PTO})$.

In another, advantageous embodiment, the control unit 94 is programmed, based on one or more sensor signals, which describe the process induced by the power drawn by the load, to distinguish between different amplitudes of the periodic function $nP_{PTO}(\theta_{PTO})$ and to appropriately adjust the transmission ratio $iP(\theta_{PTO})$.

Here one is again referred to the example of the rectangular baler 16 as load 14. As noted above, there is the operating step of the plunger 20, in which crop has already collected in the feed channel 46 but has not yet been sent into the bale chamber 38 by the stuffer fork 52. In other operating steps of the plunger 20, on the other hand, new crop has just been sent to the bale chamber 38 and the plunger 20 then compacts this material against the existing partial bale 62. The torque peaks generated in the operating steps of the plunger 20 without new crop feed at PTO shaft 18 consequently differ considerably from those in the operating step of the plunger 20 with new crop feed. Thus, a differentiation of these amplitudes (for example via a substantially known measurement of the trajectory of motion of the stuffer fork 52 or its control via the control unit 98) is advantageous.

Furthermore, the control unit 94 can monitor relevant characteristics of the operation of the load 14 and utilize them for recalculation of the function $nP_{PTO}(\theta_{PTO})$, which is automatically derived therefrom or is manually confirmed by the operator (see step S306 in FIG. 3). The example of the rectangular baler 16 can also be employed for the explanation of this functionality. For example, the flywheel 72 has an overrunning clutch, which is intended to let the drive device 70 and the plunger 20 slow down after disconnection of the PTO shaft 18. If the rotary speed of the drive motor 80 and thus the rotary speed of the PTO shaft 18 rapidly decrease because of the operator of the utility vehicle 10, this freewheeling can lead to the coupling between the PTO shaft angle and load cycle being changed. The control unit 94 can detect this decrease of the PTO shaft rotary speed 18 and deactivate the compensation until a recalculation (step S302 in FIG. 3) has been carried out. Also, sensor signals of the load or operator inputs can be employed to detect a necessary recalculation (step S302 in FIG. 3). If the operator, for example, alters a setting correlating with the machine capacity of the implement or alters a sensor-detected operating parameter of the implement (for example moisture content of the crop picked up by the rectangular baler 16), a recalculation can likewise be started (step S302 in FIG. 3).

In another embodiment, sensors are used to determine longitudinal accelerations and/or pitching motions (for example the acceleration sensor 120 or gyroscope) in order to register the periodic pitching motions and/or speed changes of the utility vehicle 10. This is advantageous in particular when the power made available by the utility vehicle 10 for the load (for example mechanically) cannot be directly registered. The control unit 94 can, in this embodiment, infer from the registered pitching motions and/or speed changes of the utility vehicle 10 what speed changes are necessary for compensation by means of the actuator 100, for which stored data can be employed. A self-learning procedure can also be employed, in which the control unit 94 tests different speed changes, registers and evaluates them by means of acceleration sensor 120, and employs the most effective one in the end.

The above implementations refer to a rectangular baler 16, the plunger 20 of which, moving back and forth, exerts a load on the drive motor 80 that varies over time, the effect of which on the propulsion speed of the utility vehicle 10 that pulls and powers the rectangular baler 16 can be automatically compensated by varying the transmission ratio of the propulsion transmission 86. The variable power drawn by the load 14 can be measured and/or determined by means of operating parameters of the load 14. Such a procedure is also possible in the case of other harvesting machinery that is either self-powered or pulled by a tractor, for example field choppers or round balers. The power drawn by the load 14 in that case is not set by the plunger 20, but rather by crop processing elements (such as chopping drums or threshing and separating devices) and is dependent on the crop throughput, which likewise can vary over time. It can be predictively registered in a substantially known way and can serve to compensate the expected change of load on the drive motor and the expected propulsion speed change.

Having described one or more embodiments, it will become apparent that various modifications can be made without departing from the scope of the invention as defined in the accompanying claims. Further embodiments of the invention may include any combination of features from one or more dependent claims, and such features may be incorporated, collectively or separately, into any independent claim.

The following is claimed:

1. A utility vehicle drive system comprising:
   a drive motor;
   a load drive train driven by the drive motor to drive a load, the load drive train having a power consumption that varies over time and that leads to a changes of-a rotary speed of the drive motor;
   a propulsion drive train driven by the drive motor to drive the utility vehicle, which has a transmission ratio that is changed by an actuator;
   a control unit in communication with the actuator, the control unit configured to receive a signal concerning the power consumption of the load and produce a correction value that is dependent on the signal; and
   wherein the control unit produces the correction value that is sent to the actuator such that a propulsion speed of the utility vehicle remains at least approximately constant and a pitching motion of the utility vehicle caused by a change of the power consumption of the load is minimized.

2. The system of claim 1, wherein the control unit generates an expected power consumption of the load from the signal.

3. The system of claim 2, wherein the control unit calculates the correction value using a change of the rotary speed of the drive motor based on the expected power consumption of the load.

4. The system of claim 1, wherein the signal concerning the power consumption of the load is calculated using operating data of the drive motor and power consumption data generated by a sensor associated with a parameter affected by the power consumption of the load.

5. The system of claim 1, wherein the control unit registers the signal over a timespan and generates an expected power consumption of the load overtime.

6. The system of claim 1, wherein the control unit generates the correction value using a comfort factor of the operator calculated on a basis of acceleration and rotary rate measurements.

7. The system of claim 1 wherein the control unit is in communication with a load control unit and a motor control unit.

8. The system of claim 1, where the utility vehicle is a tractor and the load is a rectangular baler having a plunger driven by the load drive train of utility vehicle.

* * * * *